March 7, 1933.  G. A. BERRY ET AL  1,900,857
APPARATUS FOR USE IN THE CATALYTIC OXIDATION OF GASES
Filed July 15, 1929    2 Sheets-Sheet 1

INVENTORS
George A. Berry
Clarence P. Linville
Alling P. Beardsley
by Robert W. Byerly
ATTORNEY March 7, 1933. G. A. BERRY ET AL 1,900,857
APPARATUS FOR USE IN THE CATALYTIC OXIDATION OF GASES
Filed July 15, 1929 2 Sheets-Sheet 2
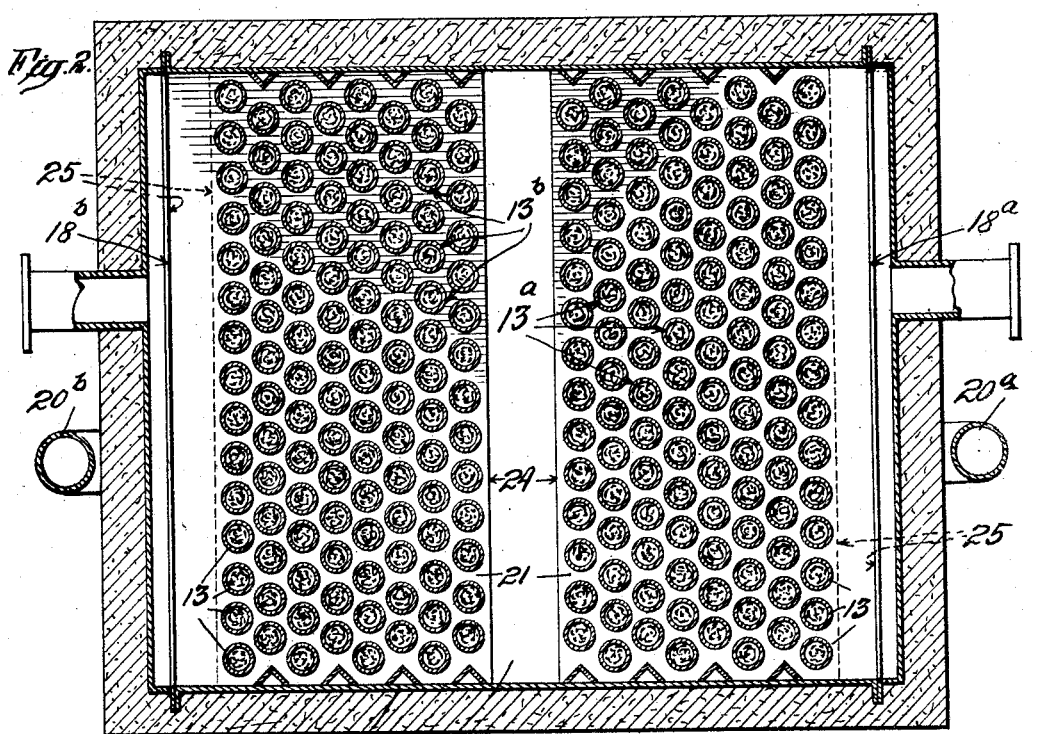
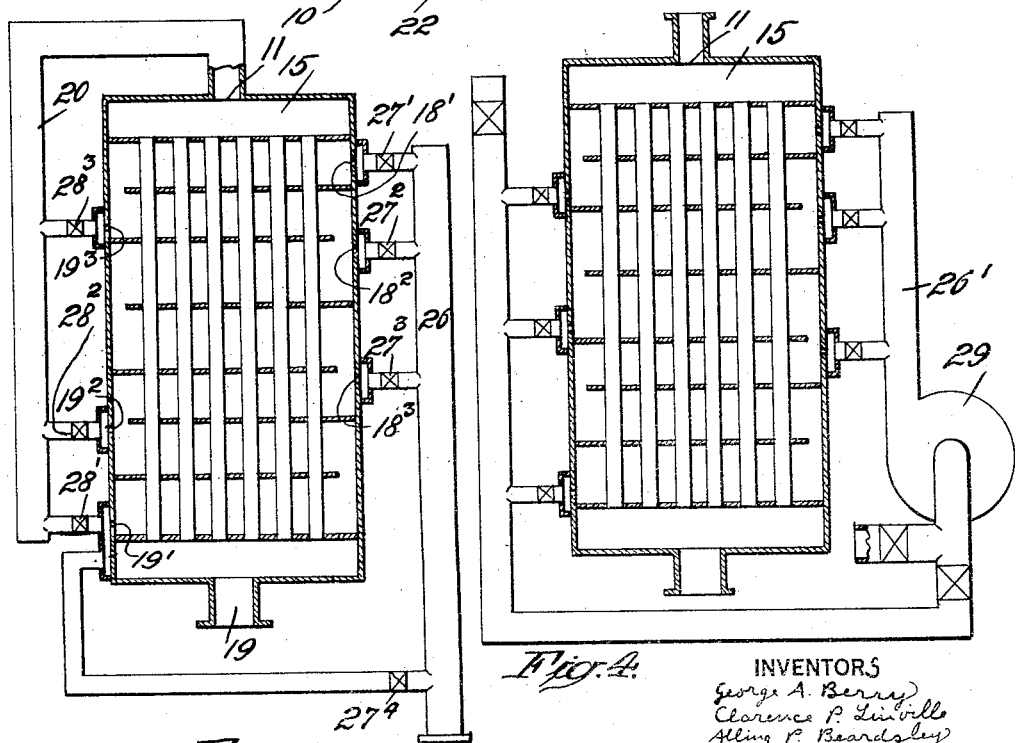
INVENTORS
George A. Berry
Clarence P. Linville
Alling P. Beardsley
by Robert W. Byerly
ATTORNEY Patented Mar. 7, 1933

1,900,857

UNITED STATES PATENT OFFICE

GEORGE A. BERRY, OF BOUND BROOK, AND CLARENCE P. LINVILLE, OF ELIZABETH, AND ALLING P. BEARDSLEY, OF PLAINFIELD, NEW JERSEY, ASSIGNORS TO CALCO CHEMICAL COMPANY, OF BOUND BROOK, NEW JERSEY, A CORPORATION OF DELAWARE

APPARATUS FOR USE IN THE CATALYTIC OXIDATION OF GASES

Application filed July 15, 1929. Serial No. 378,282.

This invention relates to apparatus for use in the catalytic oxidation of gases, and aims particularly to provide improved converter apparatus for use in the contact method of making sulphuric acid, and other oxidation processes.

In the catalytic oxidation of sulphur dioxide to sulphur trioxide, the velocity of the reaction increases rapidly with increase of temperature, while, on the other hand, the percentage of conversion at equilibrium decreases with increase of temperature. In order to obtain both rapid and substantially complete conversion, it is desirable that the stream of gases be passed through the catalytic mass at a diminishing temperature, which at the initial contact of the gases with the catalytic mass is high enough to cause a rapid conversion, and at the final contact with the catalytic mass is low enough to cause a high percentage of conversion. Since the reaction creates heat, maintaining such a temperature gradient in the stream of gases passing through the catalytic mass requires the withdrawal of heat from the gas stream at progressively diminishing rates during the progress of the stream through the catalytic mass. To attain ideal conditions, the rate of the withdrawal of heat from the stream should be a diminishing logarithmic function of the flow of the gases through the catalytic mass.

A particular object of the invention is to provide an improved converter of the tubular type in which this ideal condition, or other desired temperature conditions, may be closely approximated by accurate control of the temperature of the gases being converted while they are in contact with the catalyst. In tubular converters heretofore used, the gases to be converted have been passed through a number of long parallel tubes each containing a catalytic contact mass, and a part of the heat of conversion has been removed by causing a cooling gas, usually the gas to be converted, to flow through a casing containing the tubes in a direction parallel to the tubes. We have found that in such converters the several tubes are not cooled uniformly, so that it is impossible to obtain the same temperature gradient in each tube, and impossible to maintain the desired temperature gradient in any of the tubes.

In accordance with our invention, these difficulties are overcome by causing the gases to be converted or other cooling gas to flow perpendicularly across a plurality of short sections of a group of tubes in the converter, preferably at a velocity which is greater than that at which the gases flow through the conversion tubes. In this way, we have provided for effective and even cooling of all the tubes of the group and for differential cooling along the length of each tube.

Other features and advantages of our invention will appear from a detailed description of the embodiments of it which are shown in the accompanying drawings, in which:

Fig. 2 is a horizontal section of the converter shown in Fig. 1 taken on the line 2—2 of Fig. 1;

Fig. 3 is a diagram showing a regenerative converter similar to that shown in Fig. 1, but arranged to permit greater flexibility of the temperature control; and Fig. 4 is a diagram showing a similar converter arranged for air cooling.

Figure 1:
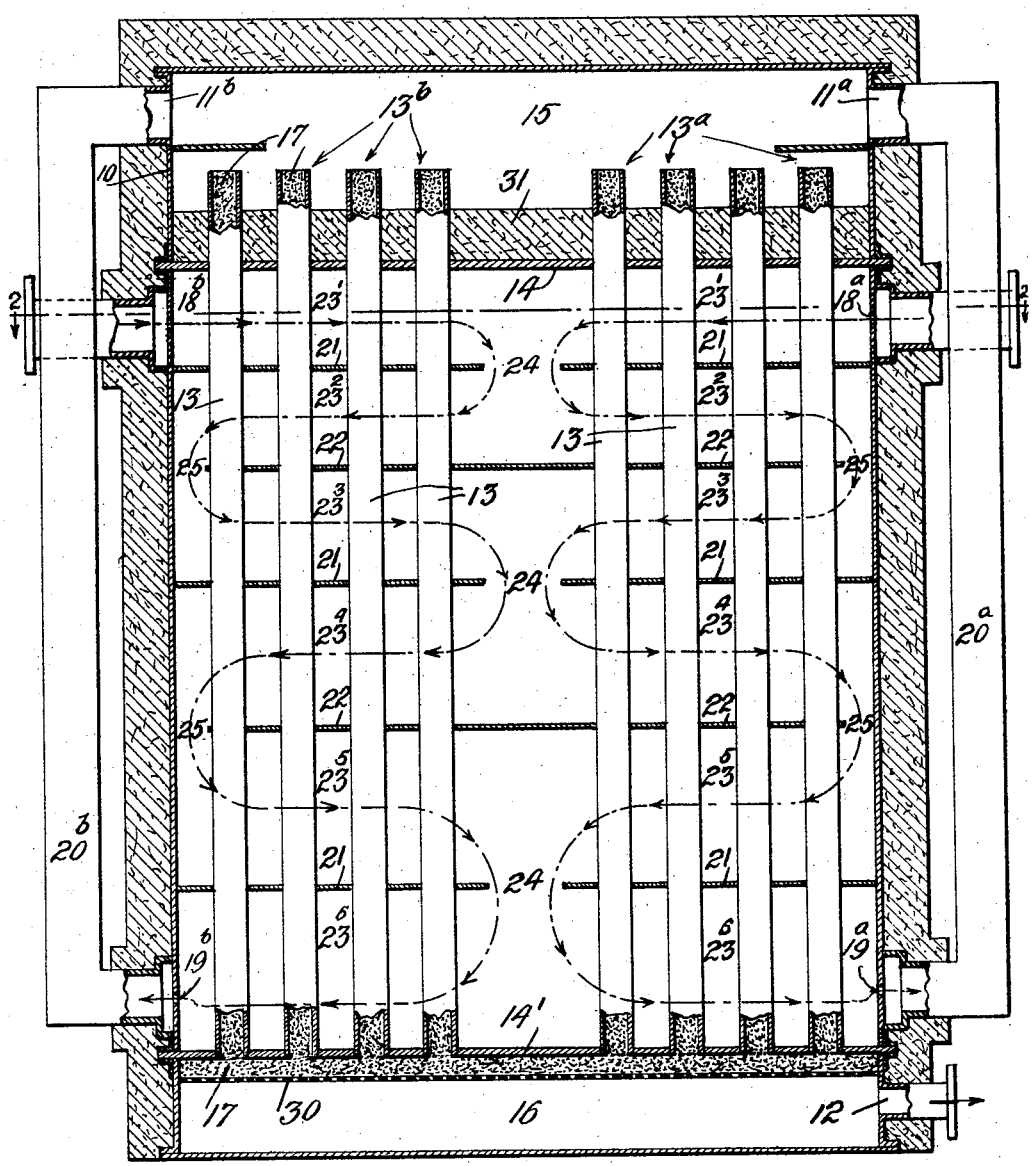
Fig. 1 is a longitudinal section of a tubular converter of the regenerative type embodying our invention in a simple form.

The converter shown in Figs. 1 and 2 has a casing 10 containing inlet openings 11a, 11b near its top and outlet openings 12 near its bottom. Within the casing are a large number of parallel closely spaced conversion tubes 13 which extend between holes in upper and lower plates 14, 14' which provide chambers 15, 16 at the ends of the casing 10. In the form shown in Figs. 1 and 2 there are two separated groups 13a, 13b of such tubes. Each tube is filled throughout its length with a porous contact mass 17 containing a catalyst adapted to cause a conversion of sulphur dioxide and oxygen into sulphur trioxide.

In order to remove the heat of this reaction, a cooling gas, in this instance the gas to be converted, is passed through the converter casing 10 in contact with the outer walls of the conversion tubes. Inlet openings $18a$, $18b$ for the cooling gas are provided in the side of the casing just below the plate 14, the outlet openings $19a$, $19b$ for the cooling gas are provided in the side of the casing just above the plate $14'$. The outlet openings $19a$, $19b$ are connected with the inlet openings $11a$, $11b$ by conduits $20a$, $20b$. They may be covered with heat insulation (not shown).

By means of a number of horizontal partitions 21, 22, the space inside the casing 10 and outside the conversion tubes 13 is divided into a large number of horizontal flow passages $23^1$, $23^2$, etc. each of which has a vertical cross-sectional area materially less than the combined internal cross-sectional area of either group of the conversion tubes 13. In the form illustrated, the partitions 21 contain middle openings 24 connecting the flow passages $23^1$, $23^2$ and $23^3$, $23^4$, etc. between the two groups of conversion tubes; while the alternate partitions 22 terminate to provide openings 25 at the sides of the converter to connect the flow passages $23^2$, $23^3$ and $23^4$, $23^5$, etc.

In the converter which has been described, the gases to be converted are introduced at the intake openings $18a$, $18b$ at a temperature materially below the conversion temperature and are caused to flow rapidly back and forth through the flow passages $23^1$, $23^2$, etc., then out through the openings $19a$, $19b$ and through the conduits $20a$, $20b$ into the chamber 15, whence they pass through the conversion tubes 13 at a relatively slow rate of flow. Since the gas passing through the flow passages $23^1$, $23^2$, etc. absorbs heat from the walls of the conversion tubes, its cooling effect diminishes during its zig-zag flow with the result that the rate at which it absorbs heat from the conversion tubes is very much greater at the upper sections of the tubes within the flow passages $23^1$ and $23^2$ than at the lower sections of the tubes within the flow passages nearer the bottom of the converter. In this way, the desired temperature gradient may be closely approximated. The differential extraction of heat in different sections of the tubes resulting from the gradual heating of the stream of cooling gas is accentuated by placing the partitions 21, 22 near the top of the converter closer together than those in the lower part of the converter, so as to cause a more rapid flow of the cooling gas and consequently a more rapid extraction of heat in the flow passages surrounding the upper portions of the conversion tubes.

Because of the zig-zag flow of the cooling gas, a substantially even cooling of corresponding sections of all the tubes is effected; for the diminishing cooling effect caused by the rise in temperature of the cooling gas in passing inwardly across the two groups of tubes in the upper flow pasage $23^1$ is compensated for by the diminishing cooling effect of the gas passing outwardly across the two groups in the next flow passage $23^2$, so that the section of the tubes between the plate 14 and the upper partition 22 at the sides of the converter gets substantially the same amount of cooling as the corresponding section of the tubes near the middle of the converter, and the same is true of the sections of these tubes between each pair of plates 21 and each pair of plates 22. Furthermore, the separation of the tubes into spaced groups and the provision of openings in the partitions between the groups shortens the cross flows of the cooling gas, so as to reduce its drop in temperature during each cross flow and to reduce the back pressure. Such separation of the tubes into groups is, however, not always essential, and is not used in the converters shown in Figs. 3 and 4.

When it is desired to provide a converter adapted for efficient use within large variations of gas volume and gas composition, the arrangement of cooling gas inlets shown in Fig. 3 may be used to advantage. In this converter, there are provided in addition to an inlet opening $18^1$ and an outlet opening $19^1$ at opposite ends of a zig-zag cooling passage, intermediate inlet openings $18^2$, $18^3$ and intermediate outlet openings $19^2$, $19^3$. A pipe 26, through which the gas to be converted is supplied, communicates by passages controlled by valves $27^1$, $27^2$, $27^3$, with each of the inlet openings $18^1$, $18^2$, $18^3$, while the pipe 20 leading to the chamber 15 communicates with each of the outlet openings $19^1$, $19^2$, $19^3$ by passages controlled by valves $28^1$, $28^2$, $28^3$. When only the valves $27^1$ and $28^1$ are open, this converter obviously operates in the same manner as that previously described. If it is found, under a particular condition of use, that this results in insufficient cooling at the middle or lower sections of the tubes, the valve $18^2$ or $18^3$ is opened sufficiently to inject cooler gas into the zig-zag stream at intermediate points. Still further regulation may be secured by opening the valve $19^2$ or the valve $19^3$ to permit some of the heated cooling gas to escape at intermediate points of the stream, but this is not ordinarily necessary.

Another method of operating the converter shown in Fig. 3 is to open the inlet valve $27^1$ and also a valve $27^4$ to admit the gas to the opening $19^1$ near the bottom of the converter. In this case, all the outlet openings, except $19^2$, are closed. In this method of operation, two zig-zag streams of cooling gas are provided, one flowing from the inlet ends of the tubes to the intermediate outlet openings $19^2$, and the other flowing from the outlet ends of the tubes to this intermediate opening. Under certain conditions, we have found that very effective temperature regulation is obtained by the use of two such streams flowing in opposite directions over different parts of the tubes.

It will be understood that, in the two converters which have been described, as in the case of other regenerative converters, the use of the gases to be converted as the cooling medium serves at the same time to pre-heat these gases before they are introduced into the conversion tubes, so that the gases may be supplied at a temperature much lower than that at which they must be introduced into the chamber 15, and the total cooling may be accurately determined by the supply temperature. While the converters which have been described are particularly adapted for obtaining the advantages of regenerative cooling, they may be operated with the use of a separate cooling gas such as air. Fig. 4 shows a converter of the type shown in Fig. 3 arranged for air cooling by connecting the intake pipe 26¹ to the discharge of an air blower 29. In this case the gases to be converted are, of course, supplied directly to the chamber 15 through the intake 11. Where the air supplied to pipe 26¹ is at a low temperature, it is, in some cases, impossible to obtain the rapid flow of the air across the tubes in the zig-zag flow passage which is necessary for even cooling of the different tubes, without causing excessive cooling. This difficulty may be avoided by maintaining the cooling air at a super-atmospheric temperature by recirculating part of it. Appropriate piping and valves permitting recirculating of any desired part of the cooling air are illustrated in Fig. 4.

In addition to the features which have been described, our invention includes other advantageous features which are clearly shown in Fig. 1.

In order to support the catalytic contact mass 17 in the conversion tubes 13, a foraminous plate 30 is provided in the chamber 16 below the plate 14'. The contact mass is poured into the tubes from the upper ends, so that it fills each tube and also the space between the plate 14' and the foraminous plate 30. The provision of this common supporting means in the contact mass in all the tubes greatly facilitates emptying the tubes when desired. It also gives the gases a free and even flow through all the tubes because of the fact that, where the gases flow through the supporting plate 30, the cross-sectional area of their flow path is much greater than the combined cross-sectional area of the tubes, so that the holes in the plate 30 can be made of a combined area equal to the cross-sectional area of all the tubes.

Instead of having their upper ends fixed in the plate 14 in the manner customary in tubular converters, the tubes 13 project through and above the plate 14, and a part or all of their projecting portions are enclosed by insulation 31. This has the advantage of preventing the withdrawal of heat from the gases to be converted at their initial contact with the catalytic mass, and thus produces a very rapid conversion at the initial contact.

What is claimed is:

1. Converter apparatus, comprising a plurality of parallel conversion tubes containing catalytic material, through which the gases to be converted flow, and means for causing a stream of cooling gas to flow back and forth transversely across all the tubes in a zig-zag path extending from the sections of the tubes near their inlet ends to the sections of the tubes at their outlet ends.

2. A converter, comprising a casing having chambers at its ends, a plurality of catalyst-containing conversion tubes connected in parallel between said chambers, and a plurality of partitions extending across said casing between said chambers and across all said tubes to divide the space outside the walls of said tubes into a plurality of flow passages each extending perpendicular to all the tubes.

3. A converter, comprising a casing containing a chamber and a plurality of catalyst-containing conversion tubes connected to said chamber in parallel, partitions extending across all said tubes within the casing to provide a flow passage perpendicular to all the tubes and of a cross-sectional area less than the combined cross-sectional area of the conversion tubes, and a conduit spaced from the tubes and connecting one end of said flow passage with the chamber.

4. A converter for use in the contact method of making sulphuric acid, comprising a casing, a partition forming a chamber at one end of said converter, a plurality of catalyst-containing conversion tubes projecting through said partition to place sections of the tubes at their intake ends within the chamber, insulation enclosing sections of the tubes within the chamber, and means for withdrawing heat from the portions of the tubes outside the chamber.

5. A converter for use in the contact method of making sulphuric acid, comprising a casing, a partition providing a chamber at one end of said casing, a plurality of catalyst-containing conversion tubes in the casing projecting into the chamber through said partition, means for preventing the escape of heat from sections of said tubes within the chamber, and means for rapidly withdrawing heat from sections of said tubes just outside the chamber and more slowly withdrawing heat from sections of the tubes remote from the chamber.

6. Converter apparatus, comprising a plurality of parallel conversion tubes containing catalytic material, through which the gases to be converted flow, means for causing a stream of cooling gas to flow back and forth across the tubes in a zig-zag path extending from the sections of the tubes near their inlet ends to an intermediate section of the tubes, and means for causing another stream of cooling gas to flow back and forth across the tubes in a zig-zag path extending from sections of the tubes near their outlet ends to said intermediate section of the tubes.

7. A converter, comprising a rectangular casing containing a group of closely and regularly spaced conversion tubes positioned to leave free spaces between the group of tubes and opposite walls of the casing, and a plurality of parallel partitions extending perpendicularly across the entire group of tubes, alternate partitions extending across the open space at one side of the group, and the other alternate partitions extending across the open space at the other side of the group, to provide a cooling conduit adapted to cause even cooling of the portions of all the tubes between each two partitions.

In testimony whereof we have hereunto set our hands.

GEORGE A. BERRY.
CLARENCE P. LINVILLE.
ALLING P. BEARDSLEY.